(12) United States Patent
Busch

(10) Patent No.: US 7,251,498 B2
(45) Date of Patent: Jul. 31, 2007

(54) RADIO HEADSET SYSTEM

(75) Inventor: Georg Busch, Ahaus (DE)

(73) Assignee: Siemens Aktiengesellschaft, Munich (DE)

( * ) Notice: Subject to any disclaimer, the term of this patent is extended or adjusted under 35 U.S.C. 154(b) by 245 days.

(21) Appl. No.: 10/472,657

(22) PCT Filed: Feb. 6, 2002

(86) PCT No.: PCT/DE02/00435

§ 371 (c)(1),
(2), (4) Date: Mar. 22, 2004

(87) PCT Pub. No.: WO02/078302

PCT Pub. Date: Oct. 3, 2002

(65) Prior Publication Data

US 2004/0147279 A1    Jul. 29, 2004

(30) Foreign Application Priority Data

Mar. 22, 2001 (DE) ................. 101 14 109

(51) Int. Cl.
*H04M 1/00* (2006.01)

(52) U.S. Cl. ............... 455/550.1; 455/73; 455/575.1; 455/575.2; 455/575.6

(58) Field of Classification Search ......... 455/550.1, 455/73, 575.2, 575.1, 575.6
See application file for complete search history.

(56) References Cited

U.S. PATENT DOCUMENTS

| 4,363,935 | A |   | 12/1982 | Toya |
| 5,373,548 | A | * | 12/1994 | McCarthy ............... 455/462 |
| 5,490,213 | A |   | 2/1996  | Huang |
| 5,590,417 | A | * | 12/1996 | Rydbeck .............. 455/575.2 |
| 5,721,783 | A | * | 2/1998  | Anderson ............... 381/328 |
| 6,078,825 | A | * | 6/2000  | Hahn et al. ........... 455/569.2 |

FOREIGN PATENT DOCUMENTS

| EP | 0 626 773  | 11/1994 |
| EP | 0 713 316  | 5/1996  |
| WO | WO 96/21307 | 7/1996 |
| WO | WO 98/26513 | 6/1998 |

* cited by examiner

*Primary Examiner*—Joseph Feild
*Assistant Examiner*—Khai Nguyen
(74) *Attorney, Agent, or Firm*—Bell, Boyd & Lloyd LLP

(57) ABSTRACT

A reproduction-receiver part is provided for use in a headset system, wherein parts are provided for wireless reception of audio signals from a mobile radio telephone network and a loudspeaker for acoustic reproduction of the signals.

4 Claims, 2 Drawing Sheets

RADIO HEADSET SYSTEM

BACKGROUND OF THE INVENTION

The present invention relates to a radio headset system as well as to handshake procedure associated therewith.

Radio headset systems are commonly known as radio headsets or headsets. They allow a conversation to be held with a communicating party whereby the hands of the user are free for other activities. Radio headsets are a simple version of handsfree devices.

Radio headset systems generally are either wired or connected wirelessly to a communication terminal. The terminal can be a fixed network telephone, a mobile phone in accordance with the GSM standard or one of the future standards, as well as a cordless telephone.

An object of the present invention is to improve the handling of radio headset systems.

SUMMARY OF THE INVENTION

In accordance with the present invention, this object is achieved for a reproduction and receive part of a radio headset, an acceptance and send part of a radio headset and an overall inventive radio headset system. The present invention also provides for handshake procedures associated with such a radio headset system.

The radio headset system is subdivided in accordance with the present invention into a reproduction and receive part and an acceptance and send part which reduces the size of the in-ear headphone system so that it is practically imperceptible in its environment. With the reproduction and receive part, the lack of a send stage results in the radiation burden near the head being extremely small.

Additional features and advantages of the present invention are described in, and will be apparent from, the following Detailed Description of the Invention and the Figures.

DETAILED DESCRIPTION OF THE INVENTION

Figure 1:
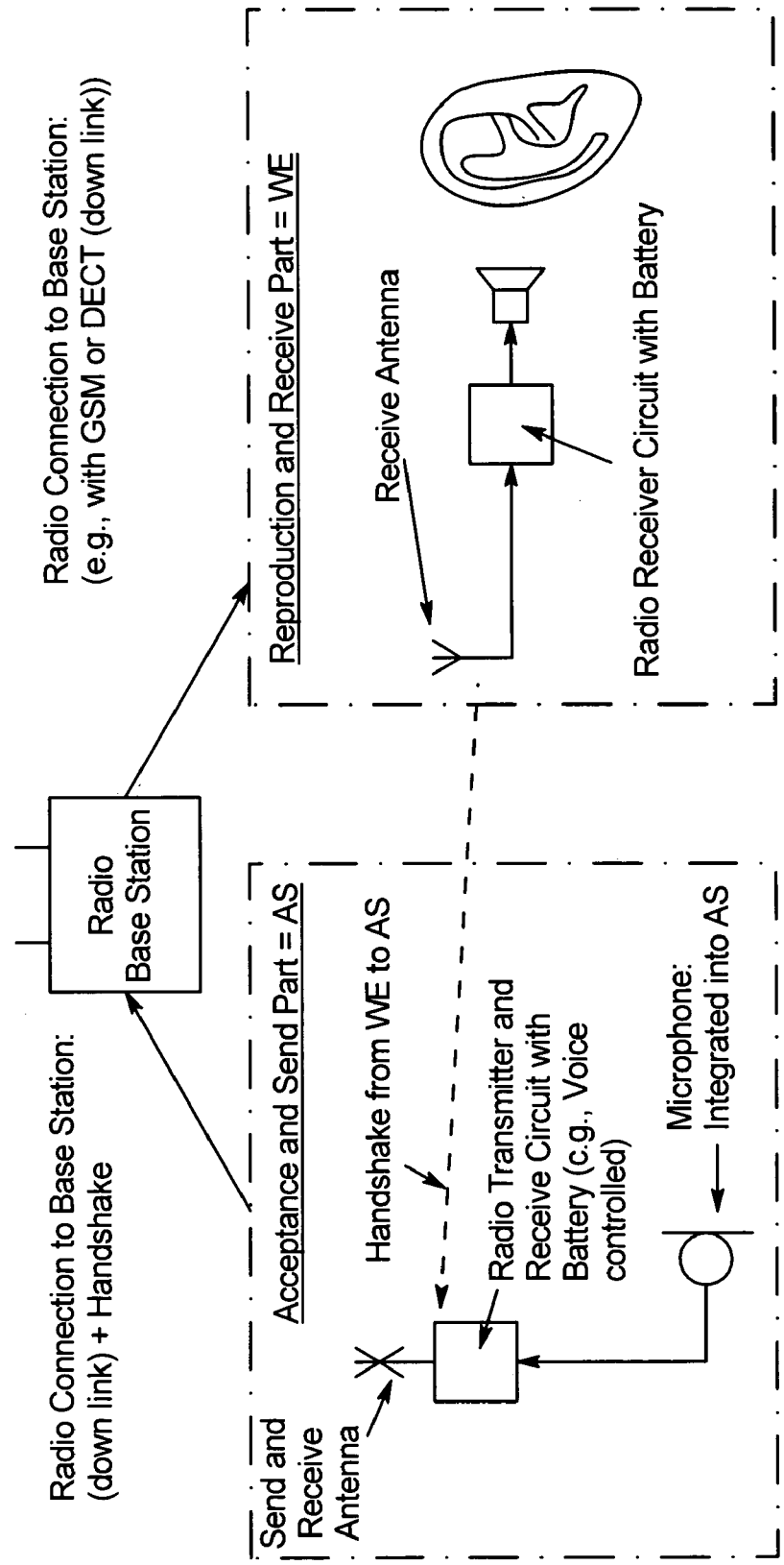
FIG. 1 shows the radio headset system in accordance with the present invention with a reproduction and receive part and an acceptance and send part.

The radio headset system in accordance with the present invention shown in FIG. 1 basically consists of a reproduction and receive part WE and an acceptance and send part AS.

The reproduction and receive part WE features a receiving device for acoustic audio signals. The receive part WE is connected directly via a mobile radio network or a mobile communication network to a radio base station. A loudspeaker is also provided for reproduction of the audio signals. Electronic and electrical components such as battery, receive antenna, control facilities and converters are not shown explicitly in FIG. 1 and are of secondary importance with respect to the present invention.

The reproduction and receive part WE only needs a comparatively small battery to operate, since only one receive device has to be operated. The reproduction and receive part WE can be worn like a hearing aid, directly on or in an ear of the user.

The acceptance and send part AS features a microphone to accept acoustic audio signals as well as a send part for forwarding the acoustic signals via a mobile radio network to a radio base station. Here, too, the electrical and electronic components such as battery, antenna, controller, send stage and converter facilities are of secondary importance for an understanding of the present invention and are not shown explicitly in FIG. 1.

The acceptance and send part AS can be a self-contained device which is worn on the wrist, like a wristwatch, for example. The send part AS also can, however, be integrated into other devices such as, for example, a palmtop or similar.

With mobile telephones, be they using the GSM standard or the DECT standard, the connection between the mobile device and the base station is monitored. What are known as handshake signals are exchanged between the two units for this purpose. With a corresponding number of errors in these signals (that is, with a bad communications link), a notification signal is sent to the mobile device and, in turn, output there.

With the radio headset system in accordance with the present invention there are two possible alternatives for this.

In a first embodiment, which is preferably employed in cordless telephones, handshake signals are sent directly from the radio base station to the reproduction and receive part WE. This part performs the signaling and gives an audible notification, if necessary.

With a second embodiment, the handshake signals are exchanged between the radio base station and the acceptance and send part AS. In the case of a bad connection, a corresponding notification then can be inserted into the audio data stream, starting out from the radio base station. The notification is then received by the reproduction and receive part WE and output acoustically.

Figure 2:
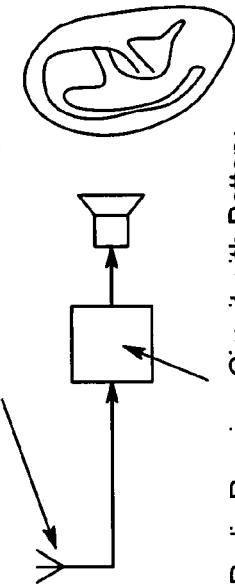
FIG. 2 shows an alternative embodiment for the inventive radio headset system.
Figure 2:
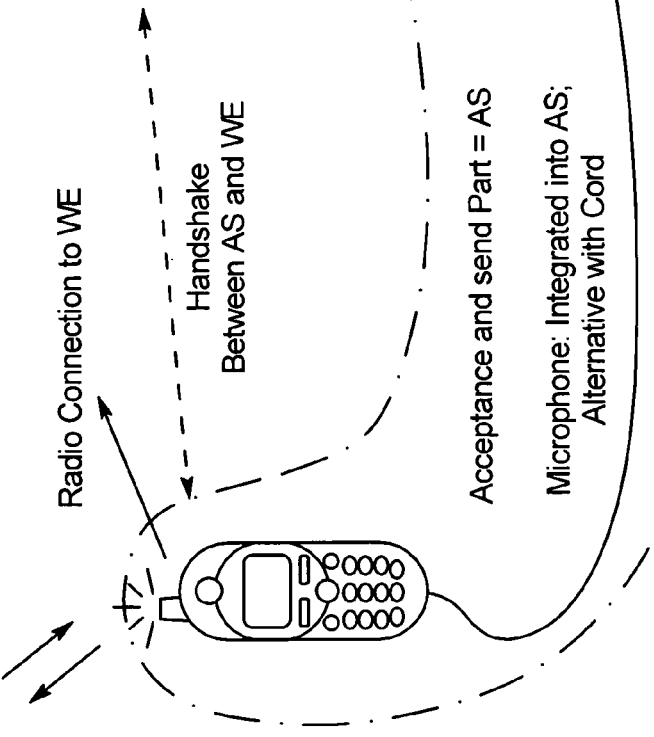

With the embodiment of the present invention as shown in FIG. 2, the acceptance and send part AS also receives audio signals from the mobile communication network. These are then forwarded via a short-range air interface, such as Bluetooth, to the reproduction and receive part WE. The send part AS is then a normal mobile radio device for which the acoustic reproduction converter is either missing or switched off.

With this embodiment, the handshake signals are exchanged between the acceptance and send part AS and the reproduction and receive part WE. A bad connection is then notified by a message inserted into the audio data stream by the send part AS to the receive part WE.

Although the present invention has been described with reference to specific embodiments, those of skill in the art will recognize that changes may be made thereto without departing from the spirit and scope of the present invention as set forth in the hereafter appended claims.

The invention claimed is:

1. A system for a radio headset, comprising:
   an acceptance-and-send part having a first antenna and first voltage supply and a microphone, wherein said antenna executes wireless transmission of audio signals recorded by said microphone over a downlink on a mobile radio network; and
   a reproduction-and-receive part that is physically separated from the acceptance-and-send part, said reproduction-and-receive part comprising a second antenna, a second power supply, and a loudspeaker, wherein the reproduction-and-receive part receives and plays back the audio signals from the downlink via said loudspeaker.

2. The system according to claim 1, wherein the reproduction-and-receive part receives handshake signals from a radio base station in connection with the audio signal, wherein a audible notification is received independent of the audio signal.

3. A system for a radio headset, comprising:
- an acceptance-and-send part having a first antenna and first voltage supply and a microphone, wherein said antenna receives audio signals having an audio data stream and a connection signal from a mobile radio network via downlink, and transmits said audio signals over a short-range air interface; and
- a reproduction-and-receive part that is physically separated from the acceptance-and-send part, said reproduction-and-receive part comprising a second antenna, a second power supply, and a loudspeaker, wherein the reproduction-and-receive part receives and plays back the audio signals from the short-range interface via said loudspeaker.

4. The system according to claim 3, wherein the acceptance-and-send part receives handshake signals from a radio base station in the mobile radio network in connection with the audio signal, wherein a audible notification is inserted into the audio data stream.

* * * * *